United States Patent [19]

Bock

[11] Patent Number: 5,383,439
[45] Date of Patent: Jan. 24, 1995

[54] AIR INLET AFTERCOOLER MOUNTING AND SEALING SYSTEM

[75] Inventor: Allyn P. Bock, West Lafayette, Ind.

[73] Assignee: Caterpillar Inc., Peoria, Ill.

[21] Appl. No.: 143,206

[22] Filed: Oct. 26, 1993

[51] Int. Cl.[6] .......................................... F02D 29/04
[52] U.S. Cl. ...................................... 123/563; 60/599
[58] Field of Search ........................... 123/563; 60/599

[56] References Cited

U.S. PATENT DOCUMENTS

| | | | |
|---|---|---|---|
| 2,646,027 | 7/1953 | Ackerman et al. | 123/563 |
| 3,091,228 | 5/1963 | Maxwell | 123/119 |
| 3,881,455 | 5/1975 | Belsanti | 123/119 CD |
| 4,191,148 | 3/1980 | Patel et al. | 123/119 CD |
| 4,269,158 | 5/1981 | Berti | 123/563 |
| 4,295,521 | 10/1981 | Sommars | 165/69 |
| 4,827,890 | 5/1989 | Pociask et al. | 123/563 |

Primary Examiner—John C. Fox
Attorney, Agent, or Firm—Dennis C. Skarvan

[57] ABSTRACT

An aftercooler mounting and sealing system for use with an internal combustion engine is disclosed including an intake manifold, a distribution manifold disposed downstream of the intake manifold, and an aftercooler clamped between the intake manifold and the distribution manifold. Resiliently compressible U-shaped seals are provided between the intake of the aftercooler and the intake manifold and between the outlet of the aftercooler and the distribution manifold to effectively seal against leakage of charged intake air from the manifold joints. The clamp load across the resiliently compressible seals is selectable independent of the clamp load across the manifolds to enhance seal life and reduce the number of fasteners required to assembly the aftercooler in place between the intake manifold and the distribution manifold.

10 Claims, 2 Drawing Sheets

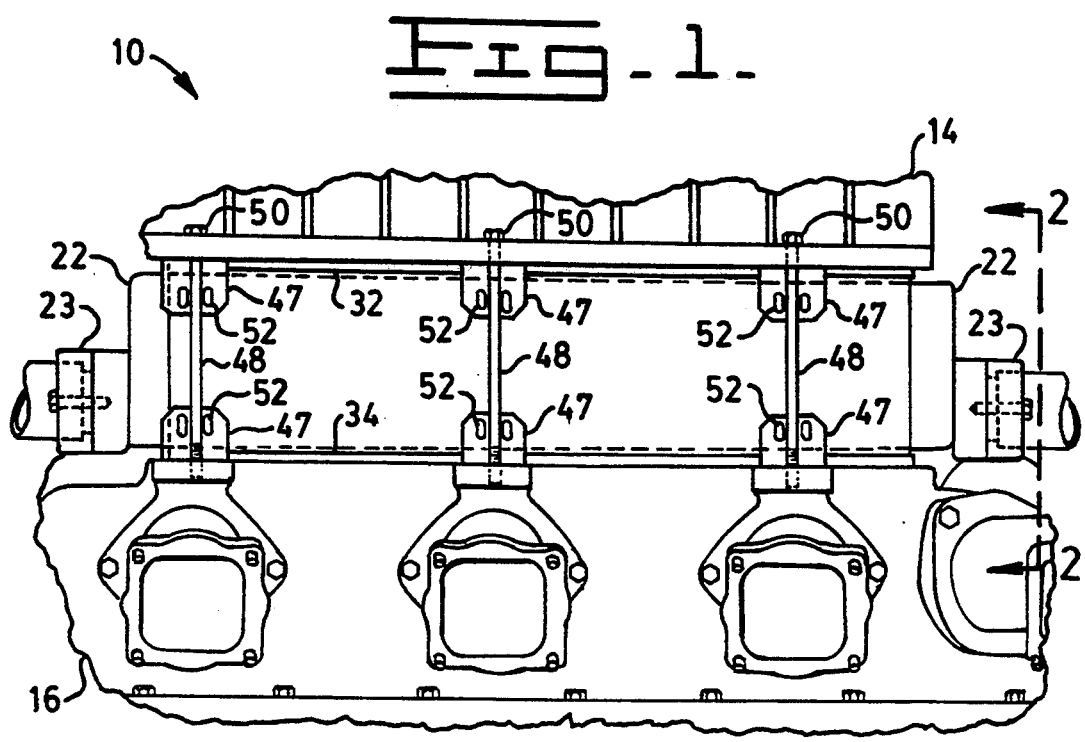

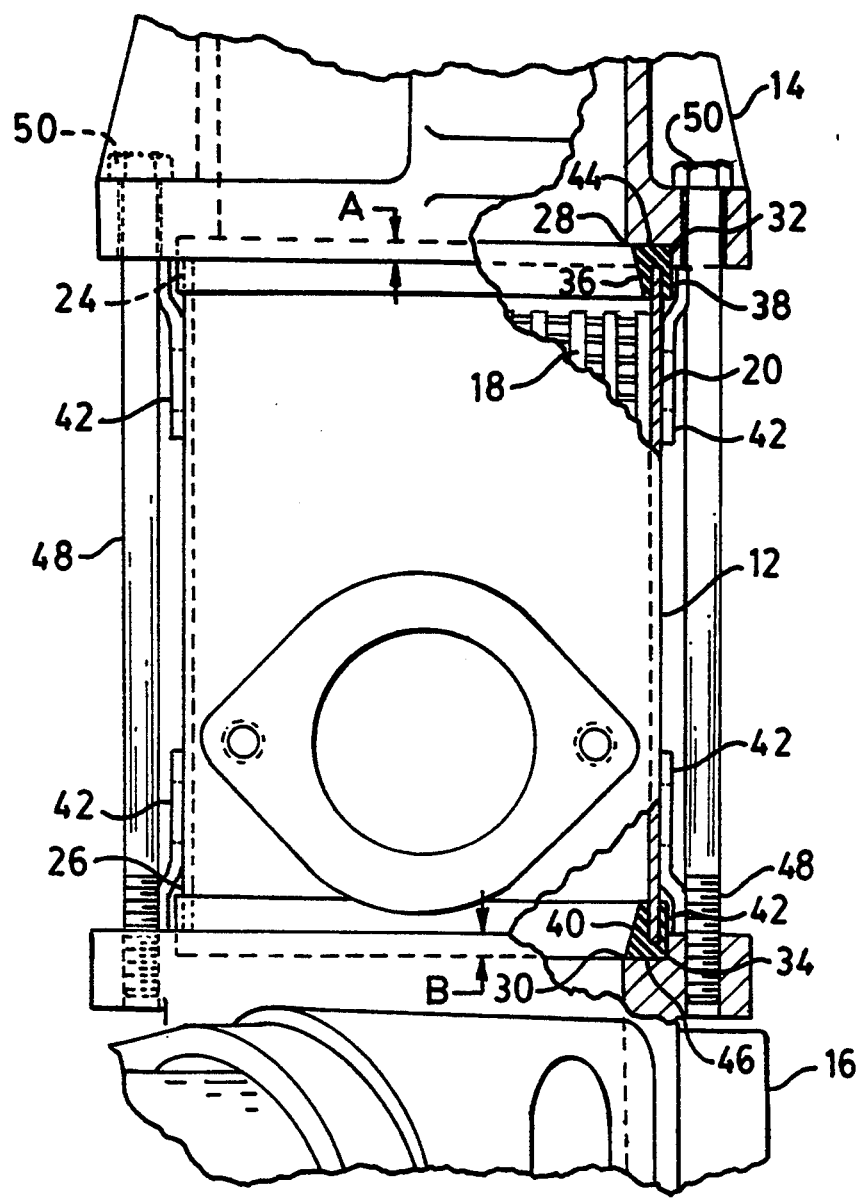

AIR INLET AFTERCOOLER MOUNTING AND SEALING SYSTEM

DESCRIPTION

1. Technical Field

The present invention relates generally to heat exchangers for use with internal combustion engines, and more specifically to an aftercooler mounting and sealing system for use with the intake air manifolding of an internal combustion engine.

2. Background Art

Typically, aftercoolers mounted in the intake passageway of an engine are disposed in a separate housing and/or are clamped between separate intake and distribution manifolding of the engine. The split-line between the various manifolds represents a potential leak path for pressurized intake air, such as that provided by a turbocharger, and, as a result, a potential loss of performance for the engine.

Prior art aftercooler sealing and mounting arrangements have generally incorporated gaskets disposed in the split-line in an attempt to seal against the loss of the pressurized or charged intake air. See, for example, U.S. Pat. No. 3,091,228 to Maxwell and U.S. Pat. No. 4,269,158 to Berti. However, for large multi-cylinder in-line or V-banked engines, the number of bolts required along the split-line results in a labor intensive assembly and disassembly of the various manifolds. Additionally, the clamp load applied to bolt the various manifolds together is equally applied across the seal or gasket. As a result, the predetermined clamping load applied across prior art split-lines often represents a compromise between a desired high clamp load to maintain the structural integrity of the manifolding and a desired low clamp load to reduce localized compression set or breakage of the split-line seal or gasket.

A need therefore exists for an aftercooler sealing and mounting arrangement which optimizes the differing desired clamping loads for the seal or gasket and desired clamping loads for the structural integrity and mounting of the intake manifolding, as well as for an aftercooler sealing and mounting arrangement which reduces the assembly and disassembly time associated with the typically large number of bolts along the manifolding split-line. Preferably, the aftercooler sealing and mounting arrangement would accomodate differing thermal growth rates between the aftercooler and manifolding as well, thus permitting the selection of a wide variety of material choices for the aftercooler construction.

DISCLOSURE OF THE INVENTION

According to one embodiment of the present invention, a heat exchanger mounting and sealing system for use with the air intake of an internal combustion engine is disclosed, comprising first manifold means for receiving pressurized intake air to be distributed to an internal combustion engine, second manifold means, disposed downstream of the first manifold means, for receiving the pressurized intake air from the first manifold means and distributing the pressurized intake air to the internal combustion engine, heat exchanger means, disposed between the first manifold means and the second manifold means, for extracting heat from the pressurized intake air, the heat exchanger means including inlet means for receiving the pressurized intake air from the first manifold means and outlet means for exhausting cooled pressurized intake air to the second manifold means, first resilient sealing means for sealing between the inlet means and the first manifold means, second resilient sealing means for sealing between the outlet means and the second manifold means, and clamping means for clamping the first resilient sealing means, the heat exchanger means and the second resilient sealing means between the first manifold means and the second manifold means, the clamping means including means for clamping the first manifold means to the second manifold means at an assembly clamp load independent of the sealing clamp load across the first resilient sealing means and the second resilient sealing means.

According to another embodiment of the present invention, an aftercooler mounting and sealing system for use with an internal combustion engine is disclosed, comprising an intake manifold, a distribution manifold disposed downstream of the intake manifold, an aftercooler disposed between the intake manifold and the distribution manifold, the aftercooler including an inlet and an outlet, a first seal disposed between the inlet and the intake manifold, a second seal disposed between the outlet and the distribution manifold, a plurality of load stop members disposed between the intake manifold and the distribution manifold, and a plurality of fasteners fastened between the intake manifold and the distribution manifold.

According to yet another embodiment of the present invention, a method for mounting and sealing an aftercooler between an intake manifold and a distribution manifold of an internal combustion engine is disclosed, the aftercooler including an aftercooler core attached between walls of an aftercooler housing, the walls of the aftercooler housing defining an inlet and an outlet and having load stop members attached thereto adjacent to the inlet and the outlet, the method comprising the steps of placing a first seal on the distribution manifold, placing the outlet of the aftercooler on the first seal, placing a second seal on the inlet of the aftercooler, placing the intake manifold on the second seal, and clamping the intake manifold to the distribution manifold across the load stop members of the aftercooler.

BRIEF DESCRIPTION OF THE DRAWINGS

FIG. 1 is a side elevational view of an aftercooler mounted between an intake manifold and a distribution manifold of an internal combustion engine according to one embodiment of the present invention.

FIG. 2 is a partial cross-sectional view taken in the direction of the arrows along line 2—2 of FIG. 1.

BEST MODE FOR CARRYING OUT THE INVENTION

Referring now to FIG. 1, an internal combustion engine 10 is shown including an aftercooler 12 mounted between intake manifold 14 and a distribution manifold 16. As is known in the art, aftercooler 12 cools the heated charged air provided by a compressor, typically a supercharger or turbocharger, prior to entry into the combustion cylinders to increase the power output and performance of engine 10. Any leakage of the charged intake air prior to combustion represents a loss of work performed by engine 10 and, therefore, a loss of performance and efficiency for engine 10. It is thus desirable to minimize any leakage in the split-line between the inlet of aftercooler 12 and intake manifold 14 and in the split-line between the outlet of aftercooler 12 and distribution manifold 16, while still providing a structurally sound aftercooler mounting arrangement. Additionally, it is desirable to reduce the number of bolts and/or fasteners clamping aftercooler 12 between intake manifold 14 and distribution manifold 16 to provide a more easily accessible aftercooler assembly.

Referring now also to FIG. 2, aftercooler 12 includes a cross-flow heat exchanger core 18 integral with and sandwiched between side walls 20. Preferably, aftercooler 12 is constructed of copper and/or a copper-nickel alloy. However, because the present invention accomodates differing thermal growth rates between the various components, the aftercooler can be constructed of various types of steel as well without affecting the performance its sealing. End walls 22 include fittings 23 for flowing a cooling fluid for exchanging heat across the core and attach to or otherwise seal across the ends of aftercooler 12 between side walls 20. As a result, side walls 20 and end walls 22 define generally a rectangularly-shaped inlet 24 and corresponding rectangularly-shaped outlet 26 for aftercooler 12. Other than fittings 23 for flowing cooling fluid and inlet 24 and outlet 26 for flowing charged intake air, aftercooler 12 is a sealed unit requiring no additional manifolding thereabout. As such, a separate housing and its associated split-line is eliminated.

Unlike prior art aftercoolers assemblies which bolt directly to either or both the intake manifold and distribution manifold, aftercooler 12 is sealingly clamped in position between intake manifold 14 and distribution manifold 16 separate from the various fasteners that mount intake manifold 14 to distribution manifold 16. In particular, intake manifold 14 includes an undercut 28 defining a sealing surface and distribution manifold 16 includes an undercut 30 defining a sealing surface, wherein undercuts 28 and 30 are appropriately shaped and sized for also locating resiliently flexible seals 32 and 34, respectively, therein. Seals 32 and 34 are generally U-shaped in cross-section, including downwardly extending side walls 36 and 38 and upwardly extending side walls 40 and 42 connected by bight portions 44 and 46, respectively.

Upon assembly, seal 32 sealingly receives the inlet ends of side walls 20 and end walls 22 between its side walls 36 and 38 and against bight portion 44 and seals against undercut 28 to provide a substantially leak-proof joint between the inlet of aftercooler 12 and intake manifold 14. Similarly, seal 34 sealingly receives the outlet ends of side walls 20 and end walls 22 between its side walls 40 and 42 and against bight portion 46 and seals against undercut 30 to provide a substantially leak-proof joint between the outlet of aftercooler 12 and distribution manifold 16. Seals 32 and 34 are preferably constructed of a resiliently flexible moldable material such as VITON, a vinylidene fluoride-hexafluoropropylene copolymer, or other moldable type rubber material. By virtue of seals 32 and 34 having at least one side wall for restraining lateral motion of aftercooler 12 (i.e., either of interior side walls 36 and 40 or of exterior side walls 38 and 42) and by virtue of seals 32 and 34 being located by correspondingly shaped undercuts 28 and 30, seals 32 and 34 effectively position aftercooler 12 in place with respect to both intake manifold 14 and distribution manifold 16.

Additionally, seal 32 includes an oversized bight portion 44 which compresses between the inlet of aftercooler 12 and intake manifold 14 when assembled in place in undercut 28, and seal 34 similarly includes an oversized bight portion 46 which compresses between the outlet of aftercooler 12 and distribution manifold 16 when assembled in place in undercut 30. In particular, bight portion 44 has a free height greater than its assembled height 'A' so that bight portion 44 resiliently compresses when assembled in place between the inlet of aftercooler 12 and intake manifold 14. Similarly, bight portion 46 has a free height greater than its assembled height 'B' so that bight portion 46 resiliently compresses when assembled in place between the outlet of aftercooler 12 and distribution manifold 16.

Clamping means in the form of bolts 48 and nuts 50 clamp intake manifold 14 to distribution manifold 16 at a predetermined clamp load independent of the clamp load applied across seals 32 and 34. To prevent overloading of seals 32 and 34, aftercooler 12 includes spacing means in the form of load stop members 47 for supporting intake manifold 14 a predetermined distance above distribution manifold 16. The predetermined distance established by load stop members 47 together with the assembly stack of seals 32 and 34 and aftercooler 12 between intake manifold 14 and distribution manifold 16 defines generally the dimensions 'A' and 'B' and, as a result, the clamp load across seals 32 and 34. The clamp load across seals 32 and 34 is therefore selectable independent of the clamp load applied across load stop members 46 by varying the assembly stack of the various components. Further, the clamp load across seal 32 is variable relative to the clamp load across seal 34 by varying the assembled dimensions 'A' and 'B'.

As shown in FIGS. 1 and 2, a small discrete number of fasteners 48 and 50 are required to supply the clamp load between the intake and distribution manifolds, rather than a large plurality of split-line bolts. As a result, assembly and disassembly times are reduced dramatically over prior art aftercooler mounting arrangements. In the specific embodiment shown, six fasteners 48 and 50 extend between mounting flanges of intake manifold 14 and distribution manifold 16 and are disposed adjacent to a corresponding numbers of load stop members 47. As such, the clamp load provided by bolts 48 is carried primarily across load stop members 47 and side walls 20 of aftercooler 12 and does not affect the clamp load across seals 32 and 34.

In the specific embodiment shown, load stop members 47 are discrete, stepped brackets attached externally to side walls 20 at attachment points 52. However, other spacing means are also contemplated for spacing intake manifold 14 a predetermined distance from distribution manifold 16. For example, rather than attaching load stop members 47 to aftercooler 12, spacing means in the form of cylindrical sleeves may alternately be provided around bolts 48 and extending between intake manifold 14 and distribution manifold 16. Similar to load stop members 47, the cylindrical sleeves carry the predetermined clamping load provided by fasteners 48 and 50, thereby preventing assembly loads from being applied across seals 32 and 34 However, unlike load stop members 47, the cylindrical sleeves do not rely on side walls 20 of aftercooler 12 mounting arrangement which clamps the aftercooler between intake and distribution manifolds without loading gaskets or seals provided between the inlet of the aftercooler and the intake manifold and provided between the outlet of the aftercooler and the distribution manifold. As such, a desirable loading can be obtained across the seals independent of the clamp load across the aftercooler to maximize seal life. Further, the number of fasteners required to clamp the aftercooler between the intake manifold and distribution manifold is reduced to permit a more readily accessible aftercooler assembly.

Still other objects and advantages of the present invention are readily apparent from the drawings and written description. For example, by utilizing an aftercooler core sandwiched between side walls and having end walls attached therebetween, the aftercooler housing is eliminated to reduce part count and simplify assembly. Also by providing positioning means, for example in the form of manifold undercuts and generally U-shaped seals, the aftercooler and the fasteners extending between the intake manifold and distribution manifold may be positioned independent of one another to facilitate tooling and part design.

I claim:

1. A heat exchanger mounting and sealing system for use with the air intake of an internal combustion engine, comprising:

first manifold means for receiving pressurized intake air to be distributed to an internal combustion engine;

second manifold means, disposed downstream of said first manifold means, for receiving the pressurized intake air from said first manifold means and distributing the pressurized intake air to the internal combustion engine;

heat exchanger means, disposed between said first manifold means and said second manifold means, for extracting heat from the pressurized intake air, said heat exchanger means including inlet means for receiving the pressurized intake air from said first manifold means and outlet means for exhausting cooled pressurized intake air to said second manifold means;

first resilient sealing means for sealing between said inlet means and said first manifold means;

second resilient sealing means for sealing between said outlet means and said second manifold means; and clamping means for clamping said first resilient sealing means, said heat exchanger means and said second resilient sealing means between said first manifold means and said second manifold means, said clamping means including means for clamping said first manifold means to said second manifold means at an assembly clamp load independent of the sealing clamp load across said first resilient sealing means and said second resilient sealing means;

wherein said clamping means includes spacing means for spacing said first manifold means a predetermined distance from said second manifold means, said predetermined distance together with the assembly stack of said first resilient sealing means, said heat exchanger means and said second resilient sealing means defining the sealing clamp load across said first resilient sealing means and said second resilient sealing means.

2. The heat exchanger mounting and sealing system of claim 1, and further comprising first means for positioning said heat exchanger means relative to said second manifold means.

3. The heat exchanger mounting and sealing system of claim 2, wherein said first means for positioning includes means for locating said second resilient sealing means relative to said second manifold means and means for locating said outlet means relative to said second resilient sealing means.

4. The heat exchanger mounting and sealing system of claim 3, and further comprising second means for positioning said heat exchanger means relative to said first manifold means.

5. The heat exchanger mounting and sealing system of claim 4, wherein said second means for positioning includes means for locating said first resilient sealing means relative to said first manifold means and means for locating said inlet means relative to said first resilient sealing means.

6. The heat exchanger mounting and sealing system of claim 5, wherein said heat exchanger means includes housing means for housing said heat exchanger means and said spacing means includes load stop means, attached to said housing means adjacent to said inlet means and said outlet means, for supporting said housing means clamped between said first manifold means and said second manifold means at said assembly clamp load.

7. An aftercooler mounting and sealing system for use with an internal combustion engine, comprising:

an intake manifold;

a distribution manifold disposed downstream of said intake manifold;

an aftercooler disposed between said intake manifold and said distribution manifold, said aftercooler including an inlet and an outlet;

a first seal disposed between said inlet and said intake manifold;

a second seal disposed between said outlet and said distribution manifold;

a plurality of load stop members disposed between said intake manifold and said distribution manifold; and a plurality of fasteners fastened between said intake manifold and said distribution manifold;

wherein said aftercooler includes first and second pairs of opposing side walls and a cross-flow aftercooler core attached between one of said first and second pairs of opposing side walls, said first and second pairs of opposing side walls defining said inlet and said outlet; and wherein said plurality of load stop members are attached to one of said first and second pairs of opposing side walls and said plurality of fasteners clamp said aftercooler between said intake manifold and said distribution manifold across said plurality of load stop members.

8. The heat exchanger mounting and sealing system of claim 7, wherein said intake manifold includes a first undercut defining an intake manifold sealing surface, said first undercut receiving and locating said first seal therein, and said distribution manifold includes a second undercut defining a distribution manifold sealing surface, said second undercut receiving and locating said second seal therein.

9. The heat exchanger mounting and sealing system of claim 8, wherein said first seal is generally U-shaped in cross-section for receiving said inlet therein, said first seal both sealing and locating said inlet relative to said intake manifold.

10. The heat exchanger mounting and sealing system of claim 9, wherein said second seal is generally U-shaped in cross-section for receiving said outlet therein, said second seal both sealing and locating said outlet relative to said distribution manifold.

* * * * *